US010009164B2

(12) United States Patent
Hou et al.

(10) Patent No.: US 10,009,164 B2
(45) Date of Patent: Jun. 26, 2018

(54) METHOD AND APPARATUS FOR UTILIZING A RECONFIGURATION TIMER FOR UPDATING TDD CONFIGURATION

(71) Applicant: QUALCOMM Incorporated, San Diego, CA (US)

(72) Inventors: Jilei Hou, Beijing (CN); Minghai Feng, Beijing (CN); Neng Wang, Beijing (CN); Chao Wei, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 14/164,907

(22) PCT Filed: Jan. 28, 2013

(86) PCT No.: PCT/CN2013/071019
§ 371 (c)(1),
(2) Date: Jan. 27, 2014

(87) PCT Pub. No.: WO2014/113987
PCT Pub. Date: Jul. 31, 2014

(65) Prior Publication Data
US 2015/0318974 A1    Nov. 5, 2015

(51) Int. Cl.
*H04L 5/14* (2006.01)
*H04L 5/00* (2006.01)
(Continued)

(52) U.S. Cl.
CPC ............ *H04L 5/14* (2013.01); *H04B 1/04* (2013.01); *H04L 5/0091* (2013.01); *H04W 28/18* (2013.01); *H04W 72/0406* (2013.01)

(58) Field of Classification Search
CPC ............ H04L 5/14; H04L 5/0091; H04B 1/04; H04W 28/18; H04W 72/0406
See application file for complete search history.

(56) References Cited

U.S. PATENT DOCUMENTS 8,209,576 B2 *  6/2012  Zhang ................... H04L 1/1887
                                                        370/338
8,254,950 B2    8/2012  De Pasquale et al.
(Continued)

FOREIGN PATENT DOCUMENTS

CN    101646242 A    2/2010
CN    101730207 A    6/2010
(Continued)

OTHER PUBLICATIONS

International Search Report and Written Opinion—PCT/CN2014/071632—ISA/EPO —dated May 12, 2014.
(Continued)

Primary Examiner — Duc C Ho
(74) Attorney, Agent, or Firm — Patterson & Sheridan, LLP

(57) ABSTRACT

In aspects, methods and apparatus for utilizing a reconfiguration timer for updating TDD configuration are provided. Certain aspects of the present disclosure propose methods and apparatus for improving system performance while using adaptive uplink-downlink reconfiguration in a time division duplex (TDD) system. For certain aspects, a reconfiguration timer may be utilized along with a signaling scheme, in order to enjoy benefits of the adaptive uplink-downlink reconfiguration with minimum signaling overhead.

28 Claims, 15 Drawing Sheets

(51) Int. Cl.
H04B 1/04 (2006.01)
H04W 72/04 (2009.01)
H04W 28/18 (2009.01)

(56) References Cited

U.S. PATENT DOCUMENTS

| | | | | |
|---|---|---|---|---|
| 9,525,537 | B2* | 12/2016 | Sun | H04L 5/0094 |
| 2012/0040674 | A1* | 2/2012 | McGilly | H04W 36/0066 |
| | | | | 455/436 |
| 2012/0113875 | A1 | 5/2012 | Alanaerae et al. | |
| 2012/0113941 | A1 | 5/2012 | Chung et al. | |
| 2012/0213196 | A1 | 8/2012 | Chung et al. | |
| 2012/0320806 | A1 | 12/2012 | Ji et al. | |
| 2013/0083736 | A1* | 4/2013 | Yin | H04W 72/0446 |
| | | | | 370/329 |
| 2013/0188516 | A1* | 7/2013 | He | H04W 28/16 |
| | | | | 370/254 |
| 2013/0201884 | A1* | 8/2013 | Freda | H04W 72/005 |
| | | | | 370/278 |
| 2013/0242815 | A1* | 9/2013 | Wang | H04L 1/1854 |
| | | | | 370/280 |
| 2013/0242818 | A1 | 9/2013 | Heo et al. | |
| 2013/0258938 | A1* | 10/2013 | Sagfors | H04W 72/02 |
| | | | | 370/312 |
| 2013/0272169 | A1 | 10/2013 | Wang et al. | |
| 2014/0086112 | A1* | 3/2014 | Stern-Berkowitz | H04W 72/1289 |
| | | | | 370/280 |
| 2015/0103703 | A1* | 4/2015 | Zeng | H04W 72/14 |
| | | | | 370/280 |
| 2015/0188690 | A1* | 7/2015 | Khoryaev | H04W 52/0251 |
| | | | | 370/280 |
| 2015/0288611 | A1* | 10/2015 | Fan | H04W 76/00 |
| | | | | 370/280 |

FOREIGN PATENT DOCUMENTS

| | | |
|---|---|---|
| CN | 102143587 A | 8/2011 |
| CN | 102281099 A | 12/2011 |
| CN | 102300303 A | 12/2011 |
| JP | 2010161598 A | 7/2010 |
| JP | 2011049771 A | 3/2011 |
| WO | WO-2010060341 A1 | 6/2010 |
| WO | WO-2012113131 A1 | 8/2012 |
| WO | 2012142761 A1 | 10/2012 |
| WO | WO-2012134580 A1 | 10/2012 |

OTHER PUBLICATIONS

International Search Report and Written Opinion—PCT/CN2013/071019—ISA/EPO—Nov. 7, 2013.

Huawei., et al., "Potential Signaling Enhancements for TDD eiMTA", 3GPP Draft, R1-130445, 3rd Generation Partnership Project (3GPP), Mobile Competence Centre, 650, Route Des Lucioles, F-06921 Sophia-Antipolis Cedex, France, vol. RAN WG1, no. St. Julian, Jan. 28, 2013-Feb. 1, 2013, Jan. 19, 2013 (Jan. 19, 2013), XP050663728, 6 Pages, Retrieved from the Internet: URL: http://www.3gpp.org/ftp/tsg_ran/WG1_RL1/TSGR1_72/Docs/ [retrieved on Jan. 19, 2013].

Samsung: "Dynamic Reconfiguration of TDD UL-DL Configuration", 3GPP Draft, R1-122267 Dynamic Reconfiguration of Too ULDL Configuration, 3rd Generation Partnership Project (3GPP), Mobile Competence Centre, 650, Route Des Lucioles, F-06921 Sophia-Antipolis Cedex, France, vol. RAN WG1, no. Prague, Czech Republic, May 21, 2012-May 25, 2012, May 12, 2012 (May 12, 2012), XP050600530, pp. 1-2, [retrieved on May 12, 2012].

Supplementary European Search Report—EP14743354—Search Authority—The Hague—dated Aug. 19, 2016.

Catt: "Signalling Mechanisms for TDD UL-DL Reconfigurations", 3GPP Draft; R1-130052, 3rd Generation Partnership Project (3GPP), Mobile Competence Centre; 650, Route Des Lucioles; F-06921 Sophia-Antipolis Cedex; France vol. RAN WG1, No. St. Julian; Jan. 28, 2013-Feb. 1, 2013 2013 Jan. 18, 2013 (Jan. 18, 2013), XP050663298, 4 Pages. Retrieved from the Internet: URL: http://www.3gpp.org/ftp/tsg_ran/WG1_RL1/TSGR1_72/Docs/[retrieved on Jan. 18, 2013].

Qualcomm Incorporated: "Signaling Mechanisms for Reconfiguration", 3GPP Draft; R1-130587 Signaling Mechanisms for Reconfiguration, 3rd Generation Partnership Project (3GPP), Mobile Competence Centre; 650, Route Des Lucioles; F-06921 Sophia-Antipolis Cedex; France vol. RAN WG1, No. St. Julian; Jan. 28, 2013-Feb. 1, 2018 Jan. 19, 2013 (Jan. 19, 2013), XP050663843.

Samsung: "Semi-Static Reconfiguration of TDD UL-DL Configuration", 3GPP Draft; R1-122266 Semi-Static Reconfiguration of TDD UL-DL Configuration, 3rd Generation Partnership Project (3GPP), Mobile Competence Centre; 650, Route Des Lucioles; F-06921 Sophia-Antipolis Cedex; France, vol. RAN WG1, No. Prague, Czech Republic; May 21, 2012-May 25, 2012, May 12, 2012 (May 12, 2012), pp. 1-2, XP050600529, [retrieved on May 12, 2012].

Samsung: "Signaling Methods for TDD UL-DL Reconfiguration," 3GPP Draft; R1-130293 Signaling Methods for TDD UL-DL Reconfiguration, 3rd Generation Partnership Project (3GPP), Mobile Competence Centre; 650, Route Des Lucioles; F-06921 Sophia-Antipolis Cedex; vol. RAN WG1, No. St Julian; Jan. 28, 2013-Feb. 1, 2013, Jan. 19, 2013 (Jan. 19, 2013), pp. 1-3, XP050663639, Retrieved from the Internet: URL: http://www.3gpp.org/ftp/tsg_ran/WG1_RL1/TSGR1_72/Docs/ (retrieved on Jan. 19, 2013].

* cited by examiner

| | Signaling methods for TDD reconfiguration | | | | |
|---|---|---|---|---|---|
| | System Information | Paging | RRC signaling | MAC signaling | PHY signaling |
| time scale (ms) | 640 | 320 | 160-200 | 50 | 10 |
| Packet TP gain | Small | Small | Medium | Medium | High |
| Specification impact | No | Yes | Yes | Yes | Yes |
| | | RAN1:HARQ, meas; | RAN1:HARQ, meas; | RAN1:HARQ, meas; | RAN1:HARQ, meas; recfg. signaling e.g. new DCI format, cross-SF scheduling |
| | | RAN2: New IE in paging | RAN2: recfg. signaling | RAN2: New signaling in MAC header | |
| | | RAN3: signaling to support IM | RAN3: signaling to support IM | RAN3: signaling to support IM | RAN3: signaling to support IM |
| Implementation complexity | NA | Low | Low | Low | Prefer solutions w/ low complexity |
| System overhead | High, Reset of HARQ, affects all UEs. | Small | Small | Small | Small |
| System impact | Recfg. Timing ambiguity, HARQ timing | Recfg. Timing ambiguity, HARQ timing, UE meas. | Recfg. Timing ambiguity, HARQ timing, UE meas. | HARQ timing, UE meas., PDSCH/PDCCH scheduling even no data | HARQ timing, UE meas., PDCCH false alarm |
| Legacy issue | No | Yes | Yes | Yes | Yes |

FIG. 4

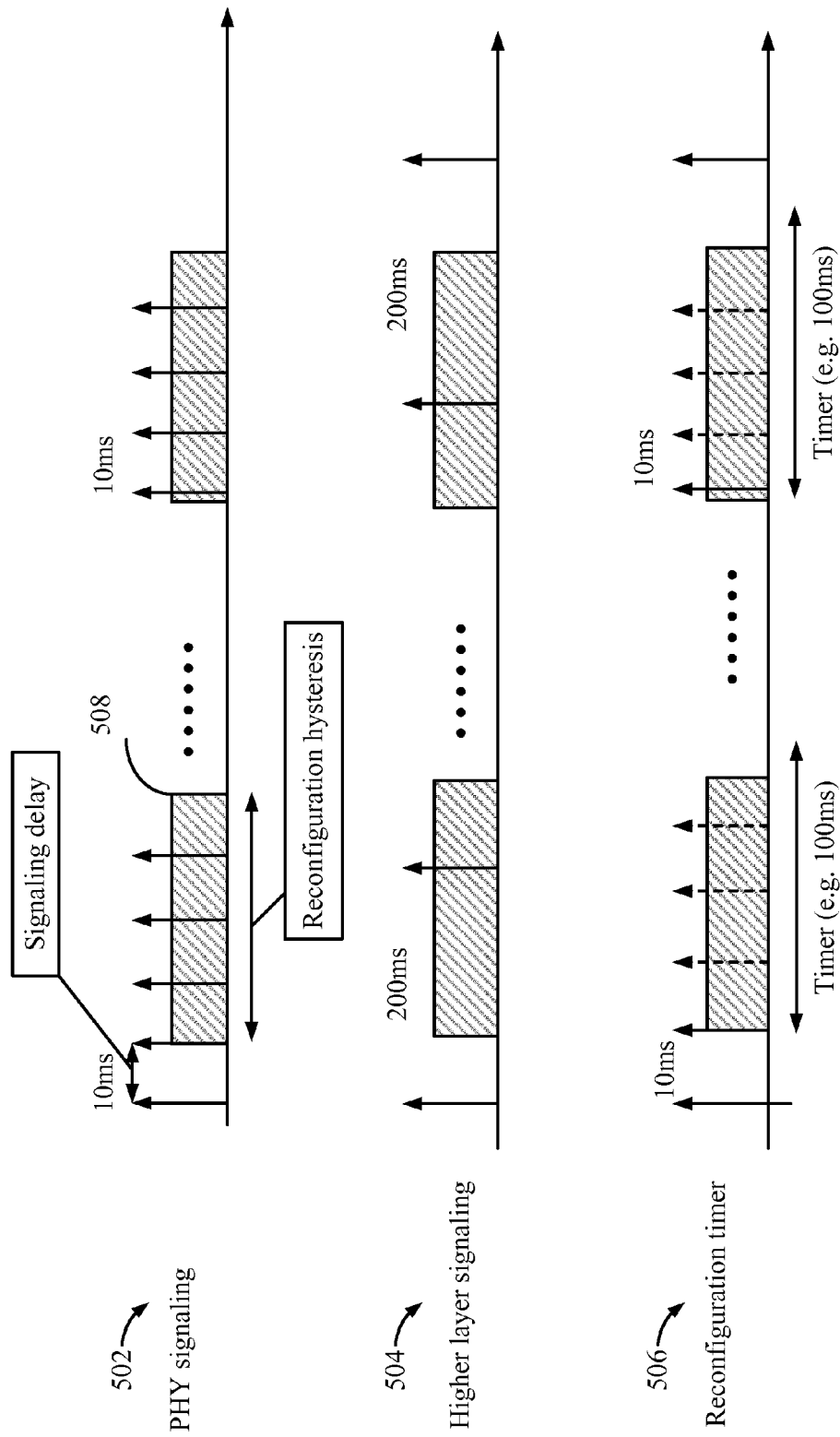

METHOD AND APPARATUS FOR UTILIZING A RECONFIGURATION TIMER FOR UPDATING TDD CONFIGURATION

CLAIM OF PRIORITY UNDER 35 U.S.C. § 119

The present application claims priority to International Application Serial No. PCT/CN2013/071019, entitled "METHOD AND APPARATUS FOR UTILIZING A RECONFIGURATION TIMER FOR UPDATING TDD CONFIGURATION," filed Jan. 28, 2013, and incorporated herein by reference in its entirety.

BACKGROUND

Field

Certain embodiments of the present disclosure generally relate to wireless communications and, more particularly, to methods and apparatus for utilizing a reconfiguration timer for updating TDD configuration.

Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system may support time division duplex (TDD) and/or frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station. In an FDD system, forward and reverse link transmissions are on different frequency regions.

SUMMARY

Certain aspects of the present disclosure provide a method for wireless communications. The method generally includes selecting a signaling mechanism for dynamically indicating an uplink-downlink configuration for time division duplex (TDD) operation, selecting a reconfiguration timer value from a set of one or more reconfiguration timer values, informing a user equipment (UE) of the selected signaling mechanism and the selected reconfiguration timer value, and transmitting reconfiguration signals to the UE according to the selected signaling mechanism and the selected reconfiguration timer value.

Certain aspects of the present disclosure provide a method for wireless communications. The method generally includes receiving information regarding a signaling mechanism for dynamically indicating an uplink-downlink configuration for time division duplex (TDD) operation and a reconfiguration timer value, and receiving reconfiguration signals according to the signaling mechanism and the reconfiguration timer value.

Certain aspects of the present disclosure provide an apparatus for wireless communications. The apparatus generally includes means for selecting a signaling mechanism for dynamically indicating an uplink-downlink configuration for time division duplex (TDD) operation; means for selecting a reconfiguration timer value from a set of one or more reconfiguration timer values; means for informing a user equipment (UE) of the selected signaling mechanism and the selected reconfiguration timer value; and means for transmitting reconfiguration signals to the UE according to the selected signaling mechanism and the selected reconfiguration timer value.

Certain aspects of the present disclosure provide an apparatus for wireless communications. The apparatus generally includes means for receiving information regarding a signaling mechanism for dynamically indicating an uplink-downlink configuration for time division duplex (TDD) operation and a reconfiguration timer value; and means for receiving reconfiguration signals according to the signaling mechanism and the reconfiguration timer value. Numerous other aspects are provided.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 4 illustrates example signaling methods that may be used for time division duplex (TDD) reconfiguration.

FIG. 5 illustrates example timing diagrams with different signaling types, in accordance with certain aspects of the present disclosure.

DETAILED DESCRIPTION

Figure 1:
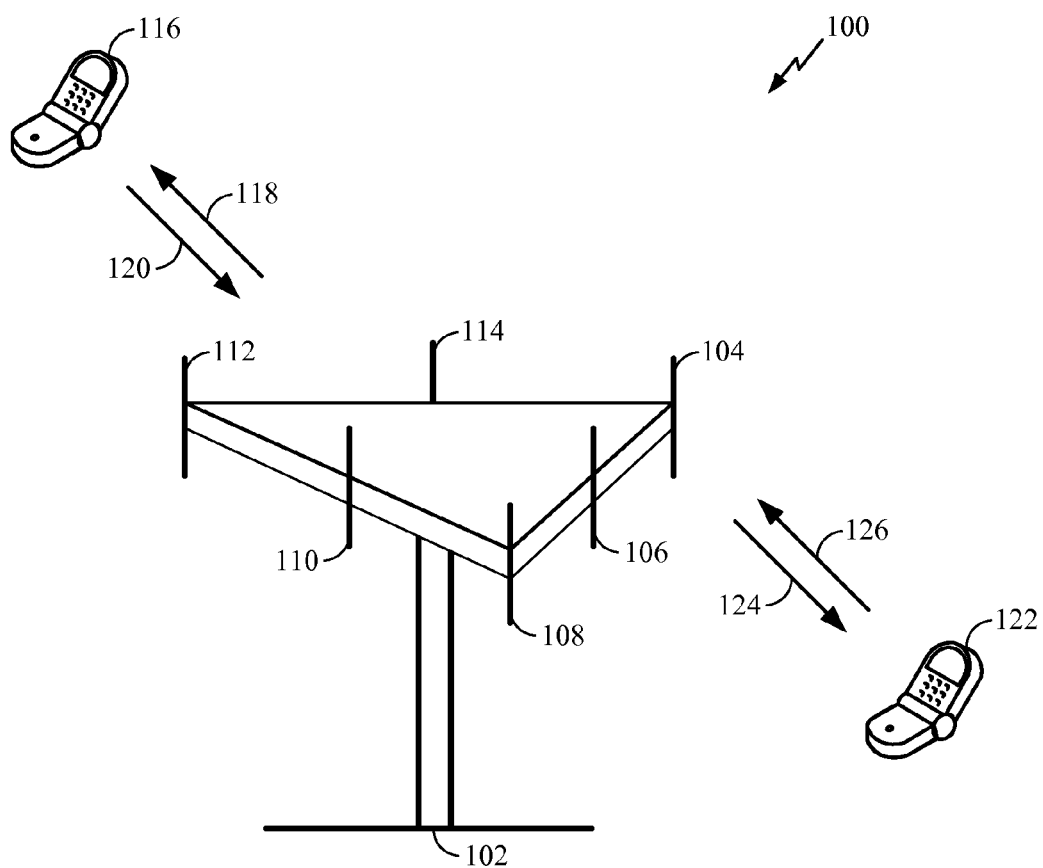
FIG. 1 illustrates a multiple access wireless communication system, in accordance with certain embodiments of the present disclosure.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA 2000, etc. UTRA includes Wideband-CDMA (W-CDMA). CDMA2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), The Institute of Electrical and Electronics Engineers (IEEE) 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a recent release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below. It should be noted that the LTE terminology is used by way of illustration and the scope of the disclosure is not limited to LTE. Rather, the techniques described herein may be utilized in various applications involving wireless transmissions, such as personal area networks (PANs), body area networks (BANs), location, Bluetooth, GPS, UWB, RFID, and the like. Further, the techniques may also be utilized in wired systems, such as cable modems, fiber-based systems, and the like.

Single carrier frequency division multiple access (SC-FDMA), which utilizes single carrier modulation and frequency domain equalization has similar performance and essentially the same overall complexity as those of an OFDMA system. SC-FDMA signal may have lower peak-to-average power ratio (PAPR) because of its inherent single carrier structure. SC-FDMA may be used in the uplink communications where lower PAPR greatly benefits the mobile terminal in terms of transmit power efficiency. SC-FDMA is currently a working assumption for uplink multiple access scheme in 3GPP Long Term Evolution (LTE), or Evolved UTRA.

Referring to FIG. 1, a multiple access wireless communication system 100 according to one aspect is illustrated. An access point 102 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 118 and receive information from access terminal 116 over reverse link 120. Access terminal 122 is in communication with antennas 106 and 104, where antennas 106 and 104 transmit information to access terminal 122 over forward link 124 and receive information from access terminal 122 over reverse link 126. In a Frequency Division Duplex (FDD) system, communication links 118, 120, 124 and 126 may use a different frequency for communication. For example, forward link 118 may use a different frequency than that used by reverse link 120.

Each group of antennas and/or the area in which they are designed to communicate is often referred to as a sector of the access point. In an aspect, antenna groups each are designed to communicate to access terminals in a sector of the areas covered by access point 102.

In communication over forward links 118 and 124, the transmitting antennas of access point 102 utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a Node B, an evolved Node B (eNB), or some other terminology. An access terminal may also be called a mobile station, user equipment (UE), a wireless communication device, terminal, or some other terminology. For certain aspects, either the AP 102 or the access terminals 116, 122 may utilize the proposed interference cancellation technique to improve performance of the system.

Figure 2:
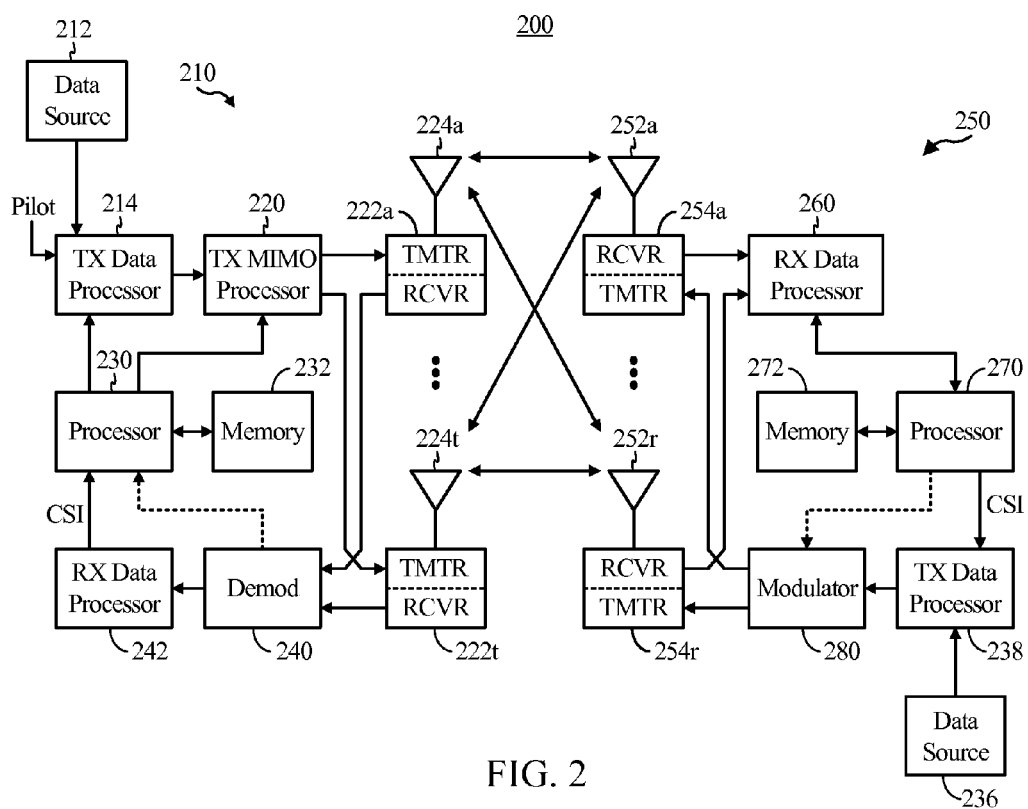
FIG. 2 illustrates a block diagram of a communication system, in accordance with certain embodiments of the present disclosure.

FIG. 2 is a block diagram of an aspect of a transmitter system 210 (e.g., AP 102) and a receiver system 250 (e.g., AT 116) in a MIMO system 200. At the transmitter system 210, traffic data for a number of data streams is provided from a data source 212 to a transmit (TX) data processor 214. An embodiments of the present disclosure is also applicable to a wireline (wired) equivalent system of FIG. 2

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK in which M may be a power of two, or M-QAM (Quadrature Amplitude Modulation)) selected for that data stream to provide modulation symbols. The data rate, coding and modulation for each data stream may be determined by instructions performed by processor 230 that may be coupled with a memory 232.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data for the data stream. The processing by RX data processor 260 is complementary to that performed by TX MIMO processor 220 and TX data processor 214 at transmitter system 210. As described in further detail below, the RX data processor 260 may utilize interference cancellation to cancel the interference on the received signal.

Processor 270, coupled to a memory 272, formulates a reverse link message. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240 and processed by a RX data processor 242 to extract the reserve link message transmitted by the receiver system 250.

Example Methods and Apparatus for Utilizing a Reconfiguration Timer for Updating TDD Configuration Certain aspects of the present disclosure propose methods for improving apparatus performance while using dynamic and/or adaptive uplink-downlink reconfiguration in a time division duplex (TDD) system. For certain aspects, a reconfiguration timer may be utilized along with a signaling scheme, in order to enjoy benefits of the dynamic and/or adaptive uplink-downlink reconfiguration with minimum signaling overhead.

Flexible uplink (UL)/downlink (DL) configuration is deemed as an efficient way to improve utilization of time division duplex (TDD) spectrum. For example, by dynamic and/or adaptive configuration selection, the uplink-downlink configuration used by a system may be adjusted based on the traffic load of the uplink and/or traffic load of the downlink.

Figure 3:
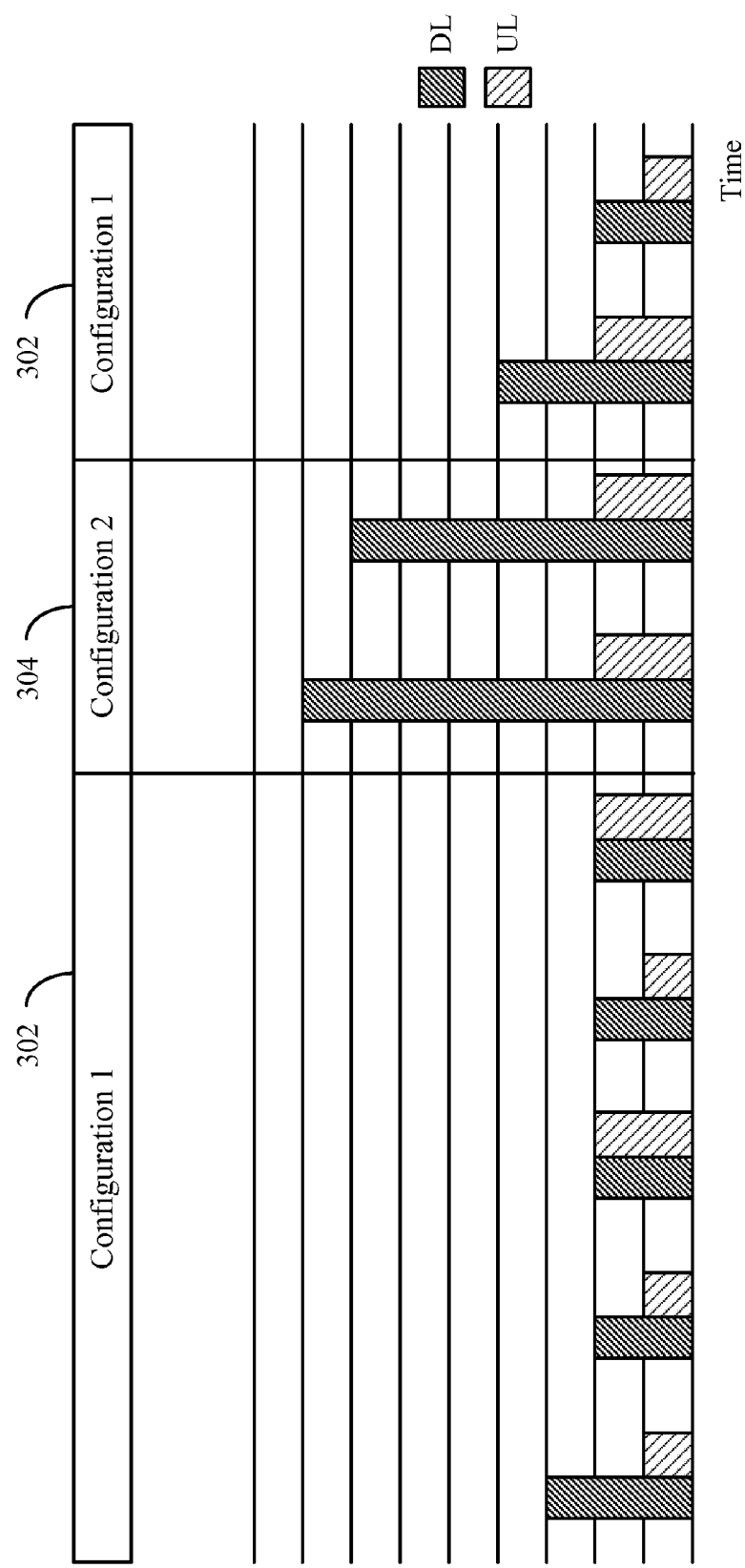
FIG. 3 illustrates example uplink and downlink traffic loads in a wireless system, in accordance with certain aspects of the present disclosure.

FIG. 3 illustrates example uplink and downlink traffic loads in a wireless system, in accordance with certain aspects of the present disclosure. As illustrated, the traffic load of uplink and downlink varies in different instances of time. Therefore, it is beneficial to use dynamic uplink-downlink configuration to better utilize the available resources. For example, a first configuration 302 may be used for some period of time when downlink and uplink traffic loads are relatively similar. A second configuration 304 may be used when load of the downlink traffic is much higher than the uplink traffic load.

Different reconfiguration mechanisms may have different signaling delays, depending on which layer signaling is used (e.g., physical layer, radio resource control (RRC) or higher layers). FIG. 4 illustrates example signaling methods that may be used for flexible UL/DL reconfiguration in time division duplex (TDD) reconfiguration. As illustrated, some of the signaling methods, for example, medium access control (MAC) signaling, physical layer (PHY) signaling have relatively short signaling delays (e.g., 50 ms and 10 ms, respectively), whereas other signaling methods (e.g., system information signaling) may have large signaling delay (e.g., 640 ms). If a signaling method with short signaling delay is used for the uplink-downlink reconfiguration, it results in a quicker response once the traffic is changing.

FIG. 5 illustrates example timing diagrams with different signaling methods, in accordance with certain aspects of the present disclosure. The first diagram 502 illustrates a timing diagram for a system using PHY signaling. As illustrated, the PHY information may be transmitted every 10 ms. The second diagram 504 illustrates a system with higher layer signaling (e.g., radio resource control (RRC) signaling) in which information is transmitted every 200 ms. The third diagram 506 illustrates a system that utilizes a signaling method with a small delay (e.g., 10 ms) plus a reconfiguration timer, as discussed in more detail below. According to certain aspects, and as illustrated, the reconfiguration information may be transmitted using the signaling method with a small delay one or more times, as needed. The system may not transmit the reconfiguration information again until the reconfiguration timer resets. The system may receive one or more confirmations of receipt of the reconfiguration information (e.g., an uplink acknowledgement message).

According to certain aspects of the present disclosure, a reconfiguration hysteresis (e.g., reconfiguration hysteresis 508) may be utilized when packet size is large and change in DL/UL traffic ratio is slow. As a result, a single configuration may be used for a relatively long period. Reconfiguration hysteresis may also prevent unnecessary frequent reconfiguration. Frequent reconfiguration may result in hybrid automatic repeat request (HARQ) timing issues across configuration boundaries, which may cause performance degradation.

Figure 6:
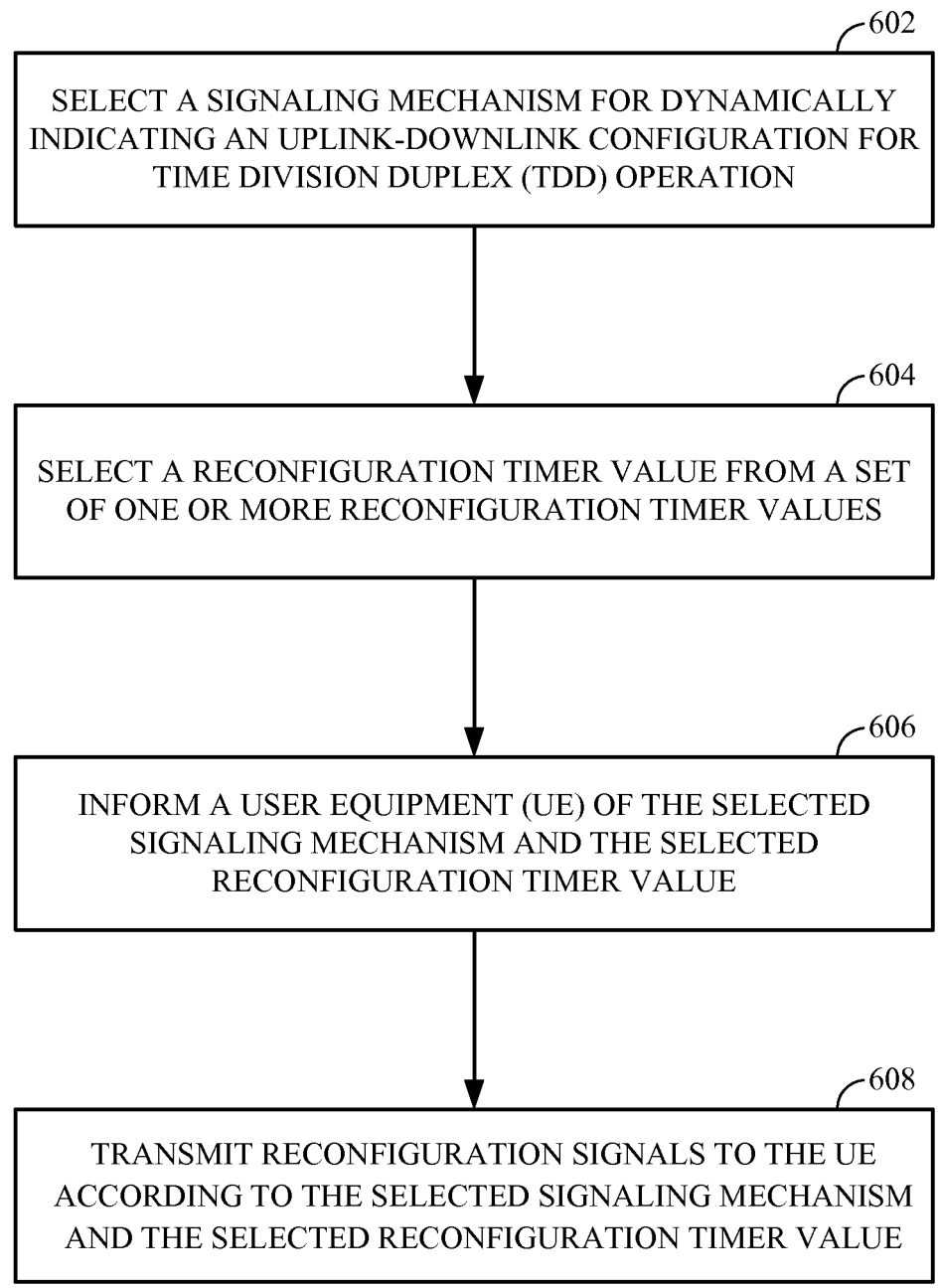
FIG. 6 illustrates example operations that may be performed by a base station to improve performance of a system with dynamic TDD configuration, in accordance with certain aspects of the present disclosure.

FIG. 6 illustrates example operations that may be performed by a base station (e.g., eNB) to improve performance of a system with dynamic TDD configuration, in accordance with certain aspects of the present disclosure.

At 602, the eNB may select a signaling mechanism for dynamically indicating an uplink-downlink configuration for time division duplex (TDD) operation. At 604, the eNB may select a reconfiguration timer value from a set of one or more reconfiguration timer values. At 606, the eNB may inform a user equipment (UE) of the selected signaling mechanism and the selected reconfiguration timer value. At 608, the UE may transmit reconfiguration signals to the UE according to the selected signaling mechanism and the selected reconfiguration timer value. In an aspect, informing the UE of the selected signaling mechanism includes utilizing a new downlink control information (DCI) format to indicate the uplink-downlink configuration. In an aspect, informing the UE of the selected signaling mechanism includes reusing one or more bits in an existing DCI format to indicate the uplink-downlink configuration. In an aspect, informing the UE of the selected signaling mechanism includes reusing one or more bits in master information block (MIB) signaling to indicate the uplink-downlink configuration.

Figure 7:
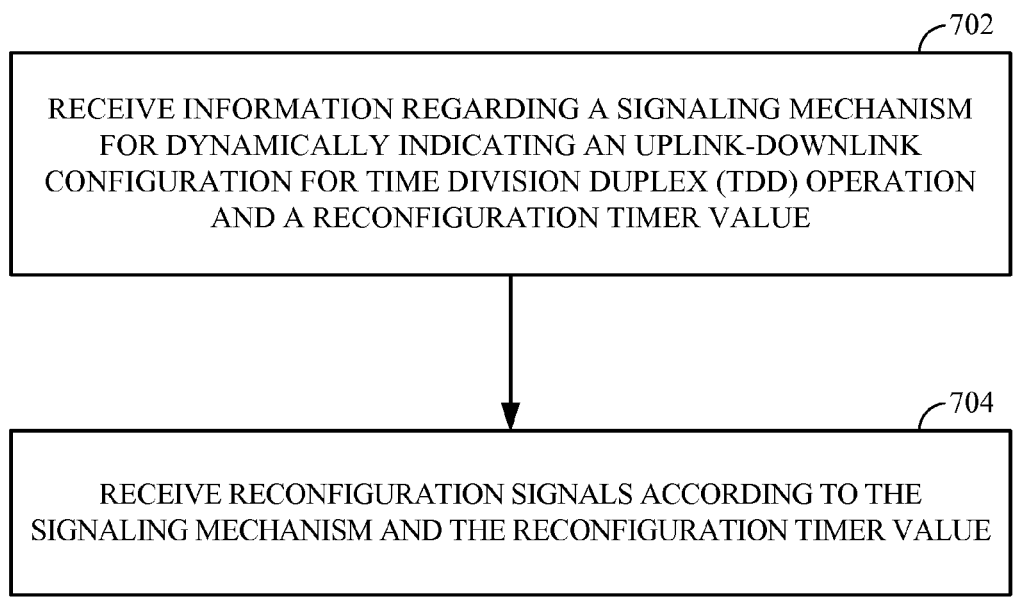
FIG. 7 illustrates example operations that may be performed by a user equipment to improve performance of a system with dynamic TDD configuration, in accordance with certain aspects of the present disclosure.

FIG. 7 illustrates example operations that may be performed by a user equipment to improve performance of a system with dynamic TDD configuration, in accordance with certain aspects of the present disclosure. At 702, the UE may receive information regarding a signaling mechanism for dynamically indicating an uplink-downlink configuration for time division duplex (TDD) operation and a reconfiguration timer value. At 704, the UE may receive reconfiguration signals (e.g., uplink-downlink TDD subframe reconfiguration signals) according to the signaling mechanism and the reconfiguration timer value. In an aspect, receiving reconfiguration signals includes receiving a DCI utilizing a new DCI format to indicate the uplink-downlink configuration. In an aspect, receiving reconfiguration signals includes receiving a DCI in which one or more bits of an existing DCI format are used to indicate the uplink-downlink configuration. In an aspect, receiving reconfiguration signals includes receiving a MIB signal in which one or more bits are reused to indicate the uplink-downlink configuration.

For certain aspects, as described above, a wireless system may be designed that utilizes a signaling mechanism which has a small delay. In addition, the wireless system may utilize a reconfiguration timer to prevent unnecessary reconfigurations and improve performance of the system. For certain aspects, utilizing a reconfiguration timer may also help in reducing physical downlink control channel (PDCCH) overhead. In addition, using a reconfiguration timer may result in savings in UE power by avoiding unnecessary PDCCH blind decoding.

For certain aspects, one or more schemes may be used to guarantee reliability of the transmissions using the signaling method with small signaling delay. For example, in the first scheme, the base station may repeat the signaling every few milliseconds (e.g., every 10 ms) for two or more times. For certain aspects, in a second scheme, the base station may use UL feedback to confirm correct reception of the new configuration. For example, the eNB may check to see whether one or more conditions are met. For example, a first condition may be whether or not an uplink acknowledgement message (UL-ACK) is received in an UL subframe of the new configuration. Additionally or alternatively, the eNB may check whether a second condition (e.g., whether another confirmation is received) is met. For example, if the eNB has received an UL-ACK message after reconfiguration (e.g., condition x=1), the eNB may check to see if the second condition is met. For the second condition, the eNB may check the PUSCH in the UL subframes of the new configuration. If the eNB has received any PUSCH after reconfiguration, the second condition is considered to be met (e.g., condition y=1). The final confirmation signal z may be defined as z=x+y. If z=1, the new configuration is switched correctly. According to certain aspects, assuming a logical INCLUSIVE OR operation, if at least one of x or y equals 1, the new configuration is switched correctly. Otherwise, if z=0, the new configuration is not received correctly and retransmission of the configuration signal may be needed. In aspects, the new configuration is deemed switched correctly if one of the conditions is met. In other aspects, the new configuration is deemed switched correctly if both conditions are met.

For certain aspects, after the reconfiguration signaling (e.g., small delay signaling) is repeated and/or confirmed, the eNB may stop transmitting the reconfiguration signals until the timer reaches the reconfiguration timer value (e.g., that was indicated to the UE by radio resource control (RRC)). When the timer reaches the reconfiguration timer value, the timer may be reset and a new configuration may be selected.

Figure 8:
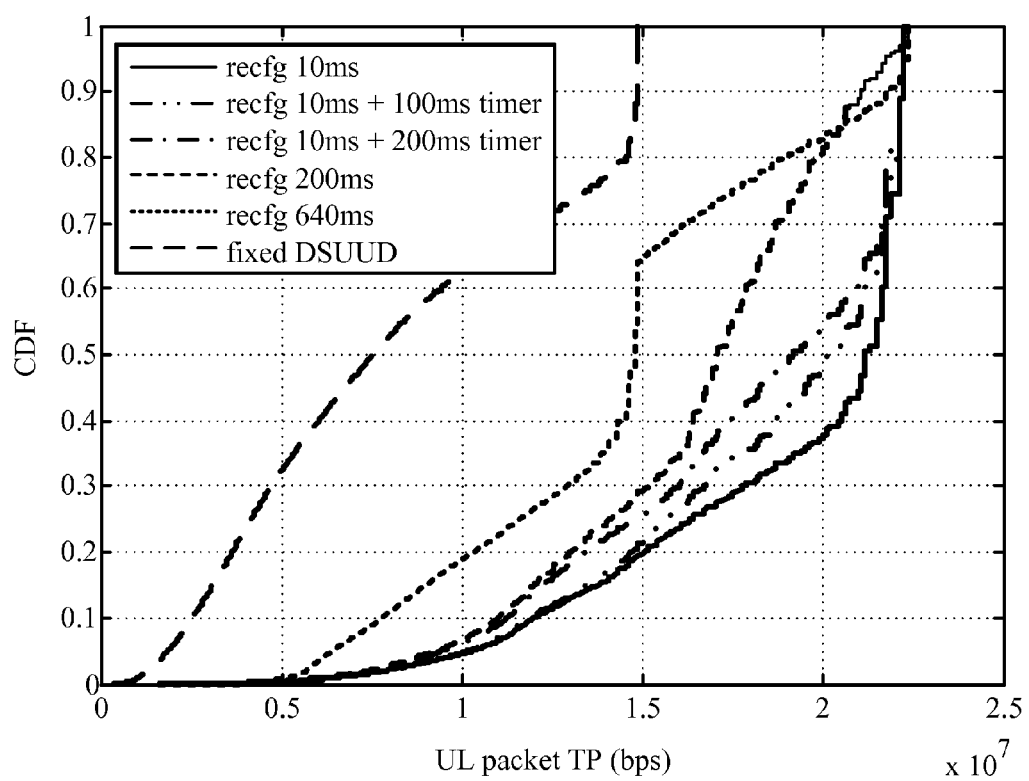
FIG. 8 illustrates example simulation results for uplink communication using the proposed reconfiguration timer for 10 ms reconfiguration, in accordance with certain aspects of the present disclosure.
Figure 9:
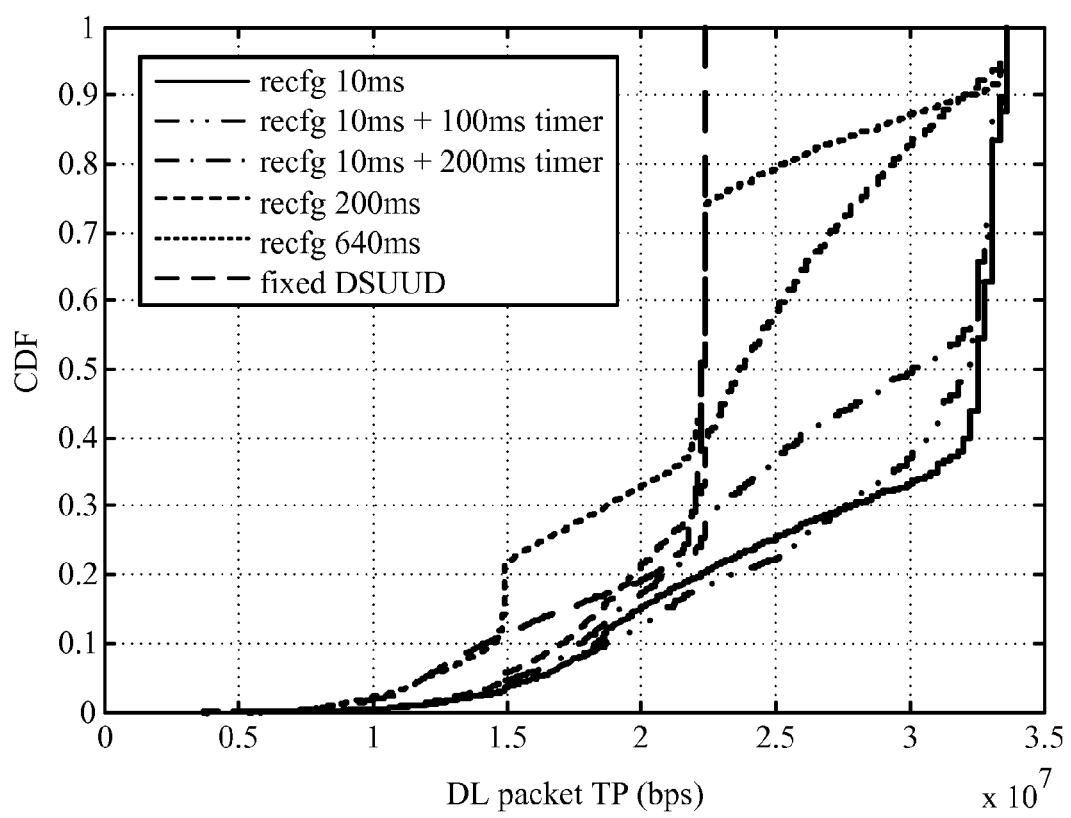
FIG. 9 illustrates example simulation results for downlink communication using the proposed reconfiguration timer for 10 ms reconfiguration, in accordance with certain aspects of the present disclosure.

FIGS. 8 and 9 illustrate example simulation results for uplink and downlink communication using the proposed reconfiguration timer for 10 ms reconfiguration. The graphs show simulation results for uplink and downlink using different signaling methods that have small (e.g., 10 ms), medium (e.g., 200 ms) or large (e.g., 640 ms) signaling delays. In addition, simulation results are shown for a large load (e.g., DL:UL arrival rate=1:1) with and without using the proposed reconfiguration timer. As illustrated, loss due to using reconfiguration timer (e.g., 100 ms) is small, especially for cell center and cell edge performance, compared to the graph that uses 10 ms reconfiguration without using the reconfiguration timer. With reconfiguration timer, reconfiguration overhead and degradation due to new HARQ timeline may also be reduced.

Figure 10:
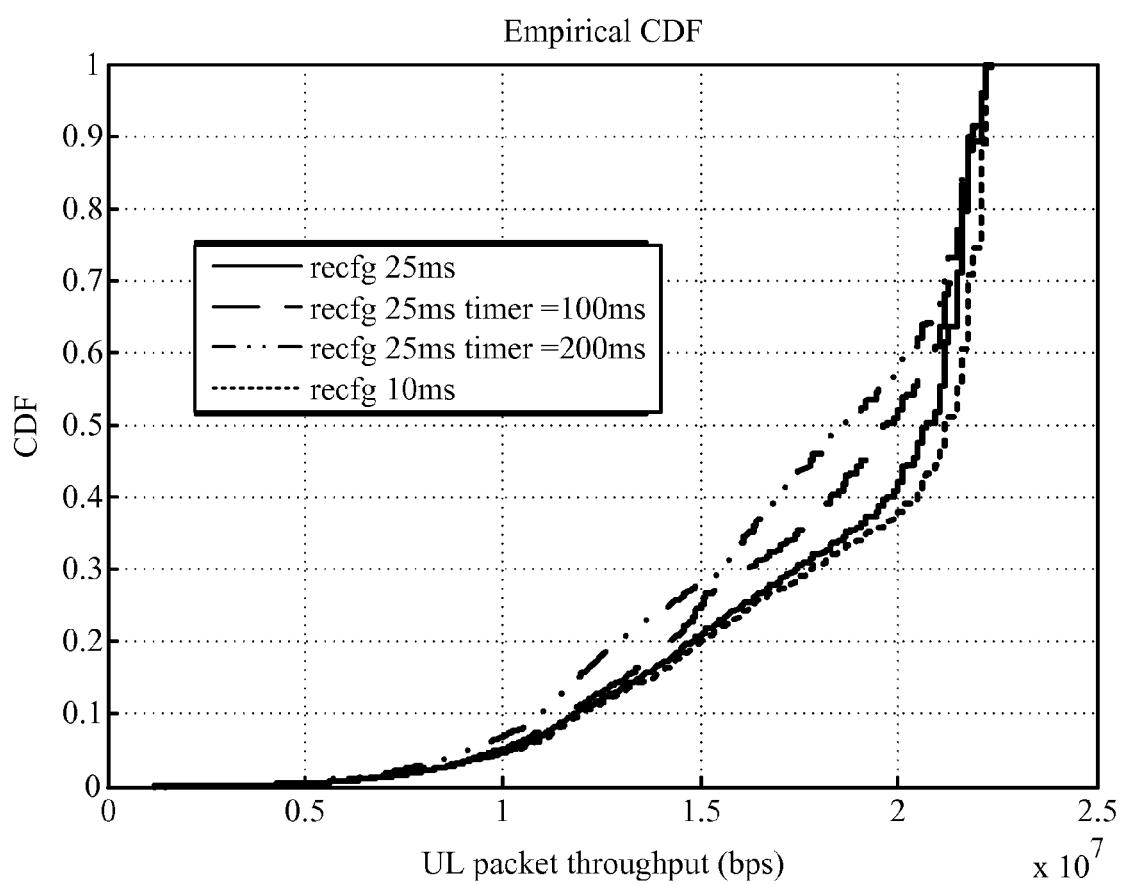
FIG. 10 illustrates example simulation results for uplink communication using the proposed reconfiguration timer for 25 ms reconfiguration, in accordance with certain aspects of the present disclosure.
Figure 11:
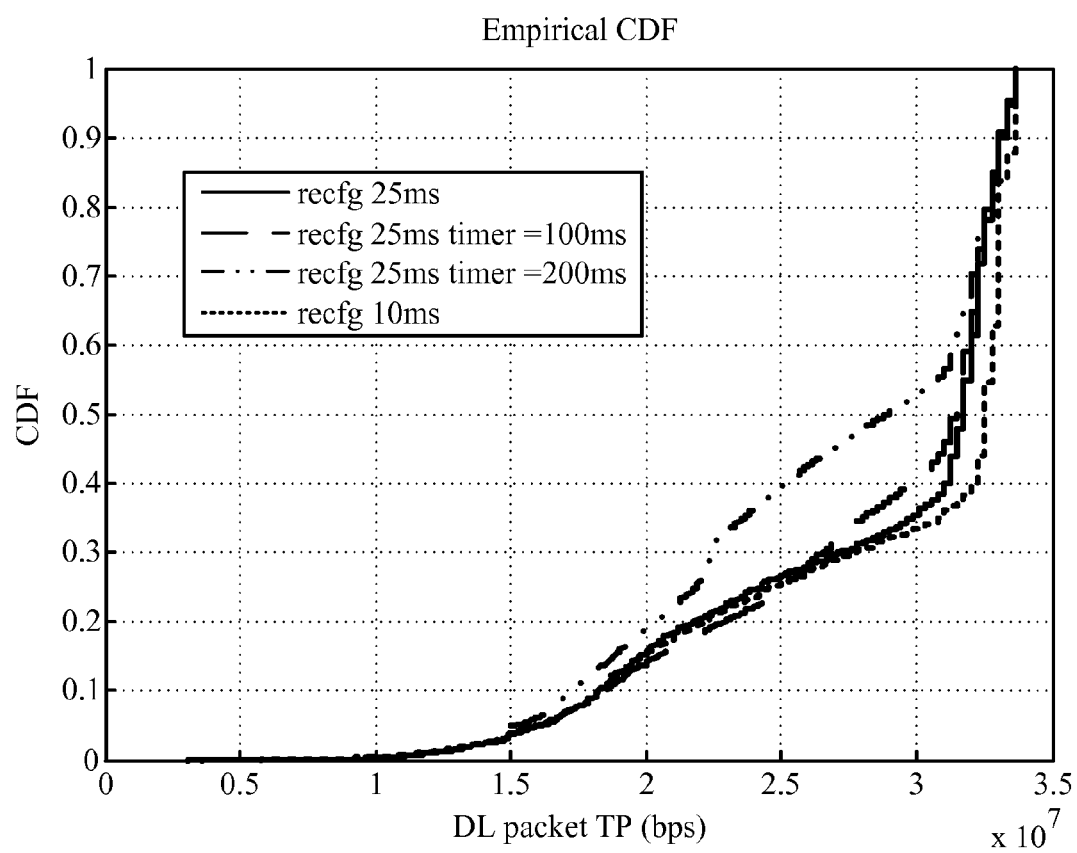
FIG. 11 illustrates example simulation results for downlink communication using the proposed reconfiguration timer for 25 ms reconfiguration, in accordance with certain aspects of the present disclosure.

FIGS. 10 and 11 illustrate example simulation results for uplink and downlink communication using the proposed reconfiguration timer for 25 ms reconfiguration and DL:UL arrival rate=1:1. The graphs show simulation results for uplink and downlink using different signaling methods that have either 10 ms or 25 ms signaling delays. As illustrated in the figures, loss due to using reconfiguration timer (e.g., 100 ms) is very small, especially for cell center and cell edge performance, compared to the graph that uses 25 ms reconfiguration without the reconfiguration timer.

Figure 12:
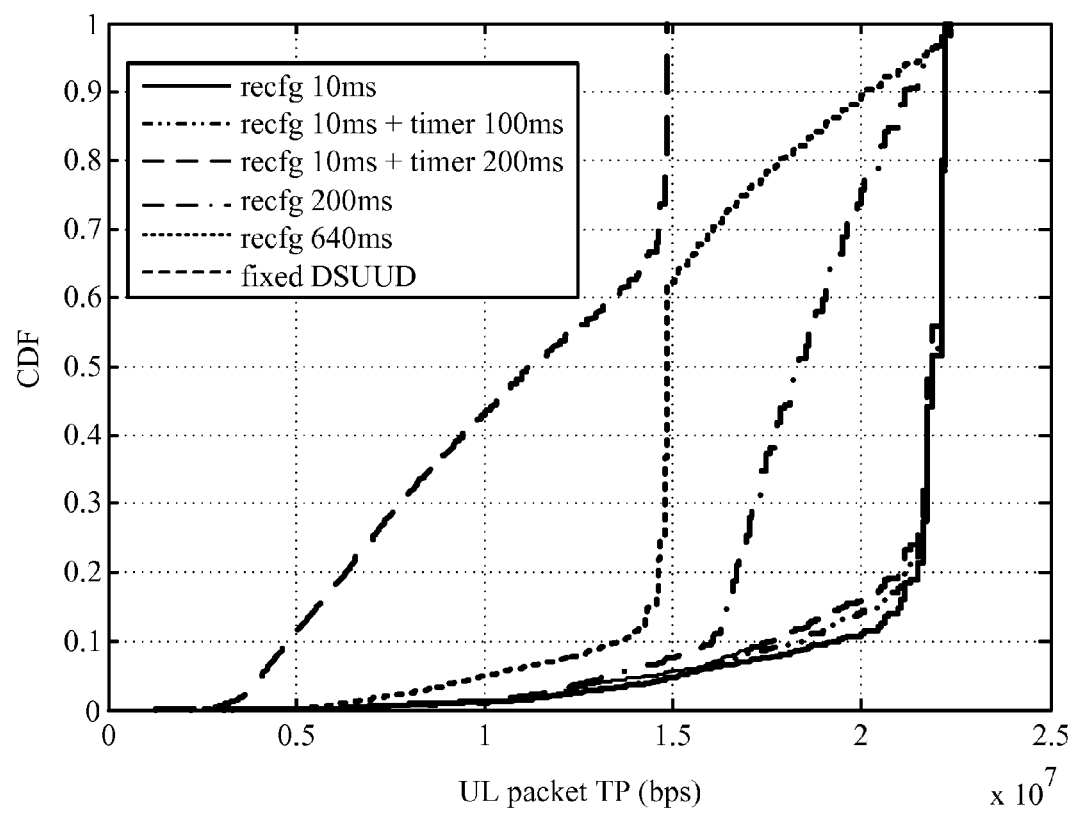
FIG. 12 illustrates example simulation results for uplink communication using the proposed reconfiguration timer for 10 ms reconfiguration with a small uplink/downlink traffic load, in accordance with certain aspects of the present disclosure.
Figure 13:
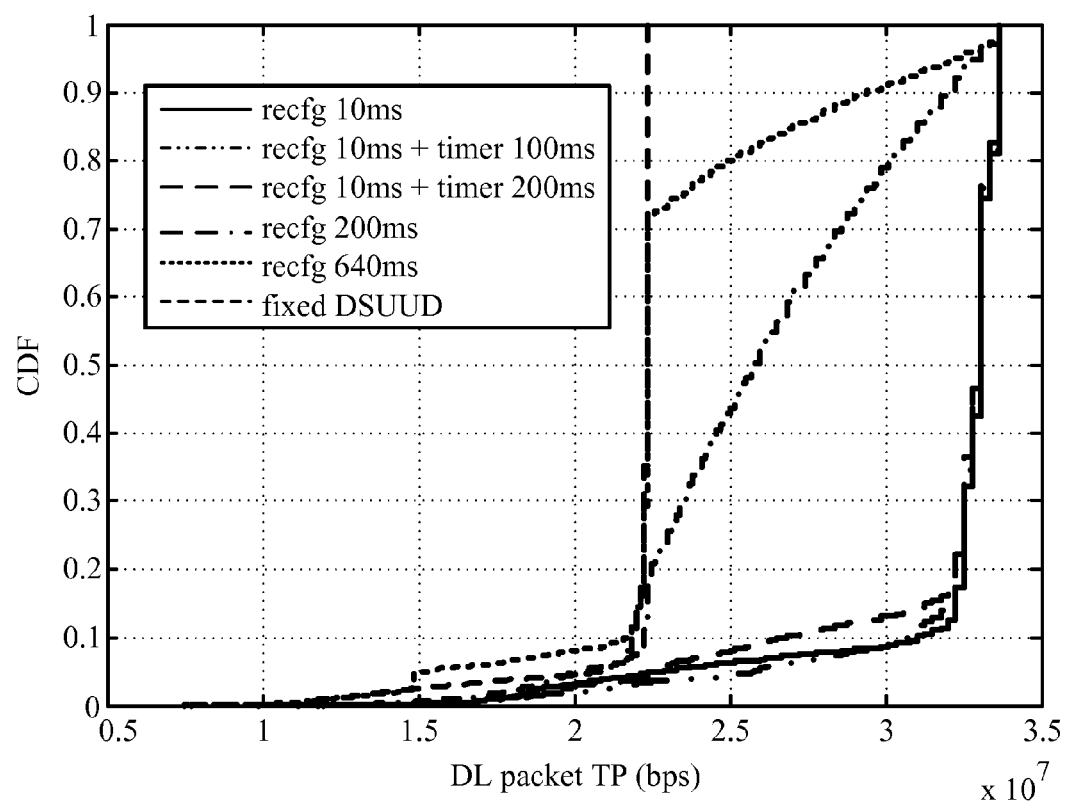
FIG. 13 illustrates example simulation results for downlink communication using the proposed reconfiguration timer for 10 ms reconfiguration with a small uplink/downlink traffic load, in accordance with certain aspects of the present disclosure.

FIGS. 12 and 13 illustrate another set of simulation results for uplink and downlink communication using the proposed reconfiguration timer for 10 ms reconfiguration with a small load (e.g., DL:UL arrival rate=0.2:0.2). These figures show that loss due to using reconfiguration timer (e.g., 100 ms) is further reduced when traffic load is low (DL:UL arrival rate=0.2:0.2) as compared to the graph that uses a 10 ms reconfiguration without the reconfiguration timer.

Figure 6A:
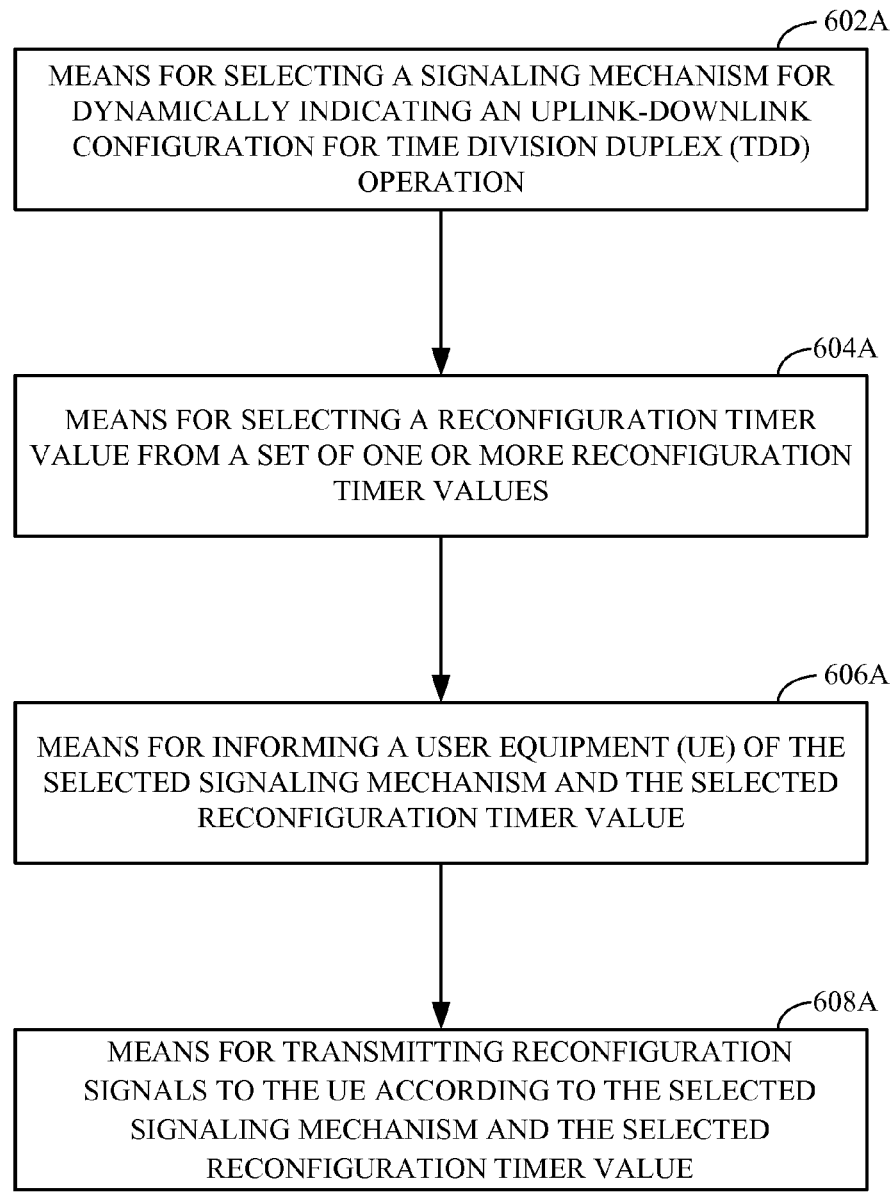
FIG. 6A illustrates example means for performing the operations shown in FIG. 6.
Figure 7A:
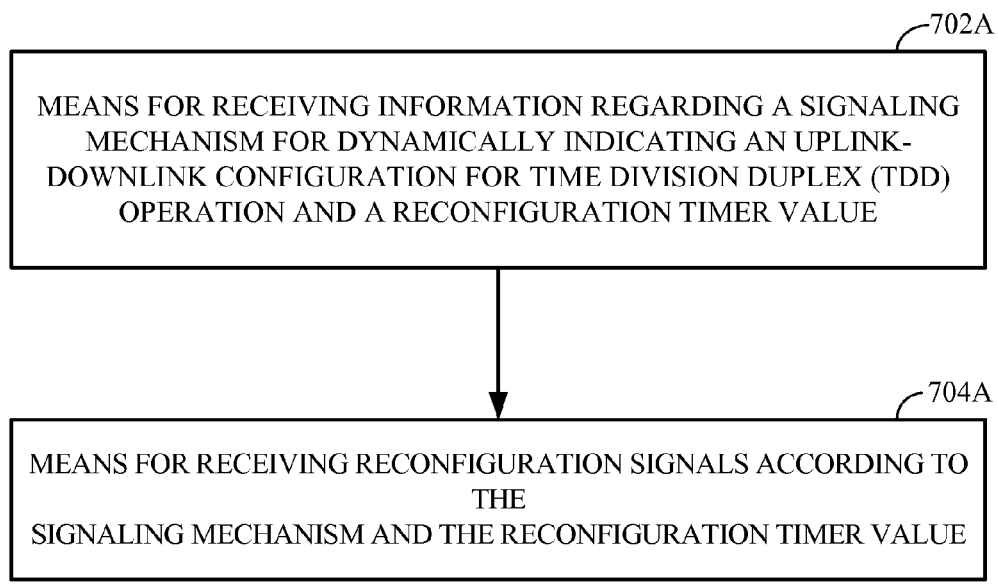
FIG. 7A illustrates example means for performing the operations shown in FIG. 7.

The various operations of methods described above may be performed by various hardware and/or software component(s) and/or module(s) corresponding to means-plus-function blocks illustrated in FIGS. 6A and 7A. The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

As used herein, a phrase referring to "at least one of" a list of items refers to any combination of those items, including single members. As an example, "at least one of: a, b, or c" is intended to cover: a, b, c, a-b, a-c, b-c, and a-b-c.

While the foregoing is directed to embodiments of the present disclosure, other and further embodiments of the disclosure may be devised without departing from the basic scope thereof, and the scope thereof is determined by the claims that follow.

What is claimed is:

1. A method for wireless communications by a base station, comprising:
    selecting a signaling mechanism for dynamically indicating an uplink-downlink configuration for time division duplex (TDD) operation;
    selecting a reconfiguration timer value from a set of more than one reconfiguration timer values;
    informing a user equipment (UE) of the selected signaling mechanism and the selected reconfiguration timer value; and
    transmitting reconfiguration signals to the UE according to the selected signaling mechanism and the selected reconfiguration timer value.

2. The method of claim 1, wherein the selected signaling mechanism comprises transmission of the reconfiguration signals with a small signaling delay.

3. The method of claim 1, wherein informing the UE of the selected signaling mechanism comprises:
    utilizing a new downlink control information (DCI) format to indicate the uplink-downlink configuration.

4. The method of claim 1, wherein informing the UE of the selected signaling mechanism comprises:
    reusing one or more bits in an existing downlink control information (DCI) format to indicate the uplink-downlink configuration.

5. The method of claim 1, wherein informing the UE of the selected signaling mechanism comprises:
    reusing one or more bits in master information block (MIB) signaling to indicate the uplink-downlink configuration.

6. The method of claim 1, wherein informing the UE of the selected reconfiguration timer value comprises:
    utilizing radio resource control (RRC) signaling to inform the UE of the selected reconfiguration timer value.

7. The method of claim 1, wherein transmitting reconfiguration signals to the UE comprises:
    transmitting the reconfiguration signals to the UE after the reconfiguration timer is reset;
    starting the reconfiguration timer when the reconfiguration signals are transmitted to the UE; and
    re-setting the reconfiguration timer when the reconfiguration timer reaches the reconfiguration timer value.

8. The method of claim 1, further comprising:
    transmitting the reconfiguration signals to the UE one or more times using the selected signaling mechanism, wherein the reconfiguration signals comprise the uplink-downlink configuration.

9. The method of claim 1, further comprising:
    utilizing uplink feedback to confirm correct reception of an uplink-downlink configuration.

10. A method for wireless communications by a user equipment (UE), comprising:
    receiving information regarding a signaling mechanism for dynamically indicating an uplink-downlink configuration for time division duplex (TDD) operation and a reconfiguration timer value selected from a set of more than one reconfiguration timer values; and
    receiving reconfiguration signals according to the signaling mechanism and the reconfiguration timer value.

11. The method of claim 10, wherein the signaling mechanism comprises transmission of the reconfiguration signals with a small signaling delay.

12. The method of claim 10, wherein receiving reconfiguration signals comprises:
    receiving a downlink control information (DCI) utilizing a new DCI format to indicate the uplink-downlink configuration.

13. The method of claim 10, wherein receiving reconfiguration signals comprises:
    receiving a downlink control information (DCI) in which one or more bits of an existing DCI format are used to indicate the uplink-downlink configuration.

14. The method of claim 10, wherein receiving reconfiguration signals comprises:
    receiving a master information block (MIB) signal in which one or more bits are reused to indicate the uplink-downlink configuration.

15. The method of claim 10, wherein receiving the reconfiguration timer value comprises:
    receiving the reconfiguration timer value in radio resource control (RRC) signaling.

16. An apparatus for wireless communications by a base station, comprising:
    means for selecting a signaling mechanism for dynamically indicating an uplink-downlink configuration for time division duplex (TDD) operation;
    means for selecting a reconfiguration timer value from a set of more than one reconfiguration timer values;
    means for informing a user equipment (UE) of the selected signaling mechanism and the selected reconfiguration timer value; and
    means for transmitting reconfiguration signals to the UE according to the selected signaling mechanism and the selected reconfiguration timer value.

17. The apparatus of claim 16, wherein the selected signaling mechanism comprises transmission of the reconfiguration signals with a small signaling delay.

18. The apparatus of claim 16, wherein the means for informing the UE of the selected signaling mechanism comprises:
    means for utilizing a new downlink control information (DCI) format to indicate the uplink-downlink configuration.

19. The apparatus of claim 16, wherein the means for informing the UE of the selected signaling mechanism comprises:
  means for reusing one or more bits in an existing downlink control information (DCI) format to indicate the uplink-downlink configuration.

20. The apparatus of claim 16, wherein the means for informing the UE of the selected signaling mechanism comprises:
  means for reusing one or more bits in master information block (MIB) signaling to indicate the uplink-downlink configuration.

21. The apparatus of claim 16, wherein the means for informing the UE of the selected reconfiguration timer value comprises:
  means for utilizing radio resource control (RRC) signaling to inform the UE of the selected reconfiguration timer value.

22. The apparatus of claim 16, wherein the means for transmitting reconfiguration signals to the UE comprises:
  means for transmitting the reconfiguration signals to the UE after the reconfiguration timer is reset;
  means for starting the reconfiguration timer when the reconfiguration signals are transmitted to the UE; and
  means for re-setting the reconfiguration timer when the reconfiguration timer reaches the reconfiguration timer value.

23. An apparatus for wireless communications by a user equipment (UE), comprising:
  means for receiving information regarding a signaling mechanism for dynamically indicating an uplink-downlink configuration for time division duplex (TDD) operation and a reconfiguration timer value selected from a set of more than one reconfiguration timer values; and
  means for receiving reconfiguration signals according to the signaling mechanism and the reconfiguration timer value.

24. The apparatus of claim 23, wherein the signaling mechanism comprises transmission of the reconfiguration signals with a small signaling delay.

25. The apparatus of claim 23, wherein the means for receiving reconfiguration signals comprises:
  means for receiving a downlink control information (DCI) utilizing a new DCI format to indicate the uplink-downlink configuration.

26. The apparatus of claim 23, wherein the means for receiving reconfiguration signals comprises:
  mean for receiving a downlink control information (DCI) in which one or more bits of an existing DCI format are used to indicate the uplink-downlink configuration.

27. The apparatus of claim 23, wherein the means for receiving reconfiguration signals comprises:
  means for receiving a master information block (MIB) signal in which one or more bits are reused to indicate the uplink-downlink configuration.

28. The apparatus of claim 23, wherein the means for receiving the reconfiguration timer value comprises:
  means for receiving the reconfiguration timer value in radio resource control (RRC) signaling.

* * * * *